(12) United States Patent
Subramaniam et al.

(10) Patent No.: US 9,374,001 B1
(45) Date of Patent: Jun. 21, 2016

(54) IMPROVING LOAD TRANSIENT RESPONSE BY ADJUSTING REFERENCE CURRENT IN ISOLATED POWER CONVERTERS

(71) Applicant: General Electric Company, Schenectady, NY (US)

(72) Inventors: Palanivel Subramaniam, Richardson, TX (US); Raghothama Reddy, Plano, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/612,956

(22) Filed: Feb. 3, 2015

(51) Int. Cl.
*H02M 1/42* (2007.01)
*H02M 3/04* (2006.01)

(52) U.S. Cl.
CPC *H02M 3/04* (2013.01); *H02M 1/42* (2013.01); *H02M 1/4225* (2013.01)

(58) Field of Classification Search
CPC ....... H02M 1/42; H02M 1/4225; H02M 7/19; H02M 7/257; H02M 7/25; H02M 3/355; H02M 2001/007; H02M 3/3374
See application file for complete search history.

(56) References Cited

U.S. PATENT DOCUMENTS

| | | | |
|---|---|---|---|
| 5,929,692 A | 7/1999 | Carsten | |
| 5,994,882 A | 11/1999 | Ma | |
| 6,897,641 B1 | 5/2005 | Herbert | |
| 7,085,145 B2 | 8/2006 | Sheehy et al. | |
| 7,639,520 B1 * | 12/2009 | Zansky | H02M 1/4225 363/65 |
| 8,237,530 B2 | 8/2012 | Ikriannikov | |
| 2007/0001653 A1 * | 1/2007 | Xu | H02M 3/158 323/225 |
| 2008/0030181 A1 * | 2/2008 | Liu | H02M 3/157 323/283 |
| 2008/0191679 A1 | 8/2008 | Williams | |
| 2010/0246220 A1 * | 9/2010 | Irving | H02M 1/4225 363/78 |
| 2012/0112657 A1 * | 5/2012 | Van Der Veen | H02M 1/4225 315/291 |
| 2012/0257429 A1 | 10/2012 | Dong et al. | |
| 2015/0028823 A1 * | 1/2015 | Li | G05F 1/66 323/234 |

FOREIGN PATENT DOCUMENTS

CN 103414342 A 11/2013

OTHER PUBLICATIONS

Kumar et al., "Performance Analysis of 2D Converter by Combining SR & KY Converters", Int. Journal of Engineering Research and Applications, pp. 327-333, vol. 4, Issue 3, Mar. 2014.
"Topology Improvement for Multiphase VRMs", pp. 26-77.

* cited by examiner

*Primary Examiner* — Harry Behm
*Assistant Examiner* — Peter Novak
(74) *Attorney, Agent, or Firm* — General Electric Company

(57) ABSTRACT

Methods and systems for improving load transient response in power conversion systems are provided herein. The system includes a primary stage and a secondary stage, an isolation barrier electrically isolating the primary stage and the secondary stage, and a primary stage controller positioned in the primary stage. The primary stage controller is configured to adjust a step-up converter reference voltage based on a load current signal indicative of a load transient. The load current signal is transmitted from the secondary stage.

17 Claims, 3 Drawing Sheets

IMPROVING LOAD TRANSIENT RESPONSE BY ADJUSTING REFERENCE CURRENT IN ISOLATED POWER CONVERTERS

BACKGROUND

The field of the invention relates generally to power conversion systems, and more specifically, to improving load transient response in power conversion systems.

Rectifiers that employ a boost and buck converter architecture or a power factor correction (PFC) circuit and an inductor-inductor-capacitor (LLC) converter architecture are popular because of their flexibility, range of operation, and ability reach higher overall efficiency. Each converter has its own controller, typically including multiple cascaded control loops for output voltage, input current, and an outer boost voltage loop. During a fast load transient, it is important to coordinate all these loops across voltage boundaries to minimize output voltage fluctuation.

At least some known rectifiers include a single controller having isolated analog and digital inputs and outputs to maintain regulation across high voltage boundaries. Such rectifiers demand more expensive digital controllers and increase an overall part count and cost, which often lack the response time necessary for proper power converter operation. Other rectifiers use disturbance rejection methods that implement more complex algorithms that require more expensive controllers and/or more parts. Many of such methods also make the output control more susceptible to measurement noise.

BRIEF DESCRIPTION

In one embodiment, a power converter is provided that includes an isolation barrier having a primary stage side and a secondary stage side, a step-up converter positioned on the primary stage side, and a primary stage controller coupled to the step-up converter and positioned on the primary stage side. The step-up converter is configured to condition an input voltage and generate a direct current (DC) boost voltage. The primary stage controller is configured to adjust a step-up converter reference voltage based on a load current signal indicative of a load transient. The load current signal is transmitted from a secondary stage side of the isolation barrier.

In another embodiment, a method is provided that includes electrically isolating a primary stage and a secondary stage of a power conversion system using an isolation barrier. The method also includes adjusting, by a primary stage controller positioned in the primary stage, a step-up converter reference voltage based on a load current signal indicative of a load transient. The load current signal is transmitted from the secondary stage.

In yet another embodiment, a power conversion system is provided that includes a primary stage and a secondary stage, an isolation barrier electrically isolating the primary stage and the secondary stage, and a primary stage controller positioned in the primary stage. The primary stage controller is configured to adjust a step-up converter reference voltage based on a load current signal indicative of a load transient. The load current signal is transmitted from the secondary stage.

DETAILED DESCRIPTION

Figure 1:
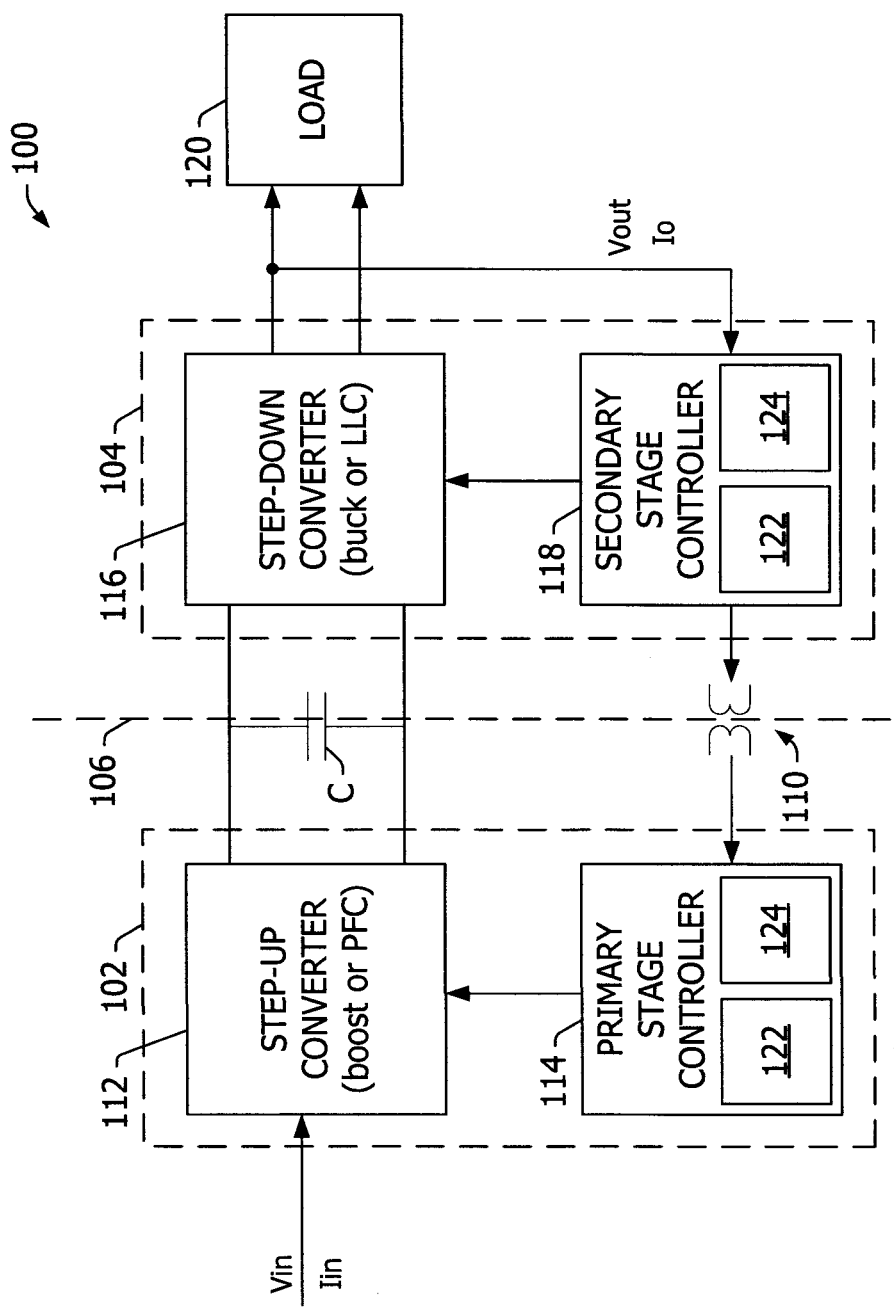
FIG. 1 is a block diagram of an exemplary embodiment of a power converter.

FIG. 1 is a block diagram of an exemplary embodiment of a power converter 100. In the exemplary embodiment, power converter 100 includes a primary stage 102 and a secondary stage 104. Primary stage 102 is coupled in electrical isolation from secondary stage 104, such as by galvanic isolation, due to an isolation barrier 106 comprising transformers, inductors, or capacitors, etc. For example, primary stage 102 has a primary ground structure (not shown) and secondary stage 104 has a secondary ground structure (not shown). Isolation barrier 106 separates the primary ground structure from the secondary ground structure. Isolation barrier 106 also separates an input voltage $V_{in}$ from an output voltage $V_{out}$ on either side of isolation barrier 106. In some embodiments, the isolation barrier includes at least one optocoupler 110 that communicatively couples primary stage 102 and secondary stage 104 across isolation barrier 106. Power converter 100 may also include a DC capacitor C coupled across a DC link between primary stage 102 and secondary stage 104.

Power converter 100 is configured to receive an input voltage $V_{in}$ and provide an output voltage $V_{out}$. In one embodiment, power converter 100 is an AC-DC converter that receives an AC input voltage and generates a DC output voltage. Alternatively, power converter 100 may be a DC-DC converter that receives a DC input voltage and converts that DC input voltage to a different DC output voltage. In such an embodiment, the DC input voltage may be received from a DC power source such as a rectifier (not shown) configured to convert an AC input voltage to a DC voltage.

In the exemplary embodiment, primary stage 102 includes a step-up converter 112 coupled to a primary stage controller 114 in primary stage 102. Step-up converter 112 is either a boost circuit or a power factor correction (PFC) circuit and is configured to condition input voltage $V_{in}$ to generate a DC boost voltage $V_b$. Alternatively, step-up converter 112 may be any type of converter that enables power converter 100 to function as described herein. Primary stage controller 114 is coupled to optocoupler 110 for communicating with secondary stage 104 across isolation barrier 106. Primary stage controller 114 is configured to control operation of step-up converter 112 based on control signals received from secondary stage 104 across isolation barrier 106. Primary stage controller 114 is further configured to adjust a step-up converter reference voltage based on a load current signal indicative of a load transient, wherein the load current signal is transmitted from secondary stage 104 of isolation barrier 106.

In the exemplary embodiment, secondary stage 104 includes a step-down converter 116 and a secondary stage controller 118. Step-down converter 116 includes a buck converter or an LLC resonant converter. Alternatively, step-down converter 116 may be any type of DC-DC converter that enables power converter 100 to function as described herein. Step-down converter 116 is configured to condition the DC boost voltage $V_b$ received across isolation barrier 106 from step-up converter 112 to provide output voltage $V_{out}$ to a load 120. Secondary stage controller 118 is configured to control step-down converter 116 to deliver output voltage $V_{out}$ and output current $I_o$ to load 120. Secondary stage controller 118 is also configured to continuously and rapidly sample output current $I_o$ being delivered to load 120 to monitor for a load transient.

Secondary stage controller 118 is configured to generate and transmit a signal representing measured load current $I_o$. Measured load current $I_o$ may be transmitted to primary stage controller 114 continuously at predetermined intervals, when a transient is measured, or when a transient greater than a threshold is measured. In the exemplary embodiment, the measured load current signal $I_o$ is transmitted by secondary stage controller 118 using pulse width modulation (PWM) or pulse frequency modulation (PFM).

In the exemplary embodiment, primary and secondary stage controllers 114 and 118 are each implemented by a processor 122 communicatively coupled to a memory device 124 for executing instructions. In some embodiments, executable instructions are stored in memory device 124. Alternatively, controllers 114 and 118 may be implemented using any circuitry that enables controllers 114 and 118 to control operation of primary and secondary stages 102 and 104, respectively, as described herein. For example, in some embodiments, controllers 114 and 118 may include a state machine that learns or is pre-programmed to determine information relevant to load 120 requiring power. For example, controllers 114 and 118 may dynamically determine what power resources will be needed and at what performance level and environmental conditions (e.g., temperature, humidity, time of day, etc.) those power resources will need to operate. Controllers 114 and 118 may perform dynamic monitoring to determine whether a given load 120 is satisfied with the power delivered, and whether delivered power is free of harmonics, transients, etc. In some embodiments, dynamic monitoring may include tracking resource usage to determine how much current or voltage should be delivered. Controllers 114 and 118 may also monitor and/or control rapidity (i.e., bandwidth) and inverter capability (e.g., overload, reactive power, active power) to facilitate ensuring reliability of system 100 and minimizing performance degradation.

In the exemplary embodiment, controllers 114 and 118 perform one or more operations described herein by programming processor 122. For example, processor 122 may be programmed by encoding an operation as one or more executable instructions and by providing the executable instructions in memory device 124. Processor 122 may include one or more processing units (e.g., in a multi-core configuration). Further, processor 122 may be implemented using one or more heterogeneous processor systems in which a main processor is present with secondary processors on a single chip. As another illustrative example, processor 122 may be a symmetric multi-processor system containing multiple processors of the same type. Further, processor 122 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), digital signal processors (DSP), and any other circuit capable of executing the functions described herein. In the exemplary embodiment, processor 122 causes controllers 114 and 118 to control operation of primary and secondary stages 102 and 104, respectively, as described herein.

In the exemplary embodiment, memory device 124 is one or more devices that enable information such as executable instructions and/or other data to be stored and retrieved. Memory device 124 may include one or more computer readable media, such as, without limitation, dynamic random access memory (DRAM), static random access memory (SRAM), a solid state disk, and/or a hard disk. Memory device 124 may be configured to store, without limitation, application source code, application object code, source code portions of interest, object code portions of interest, configuration data, execution events and/or any other type of data.

Figure 2:
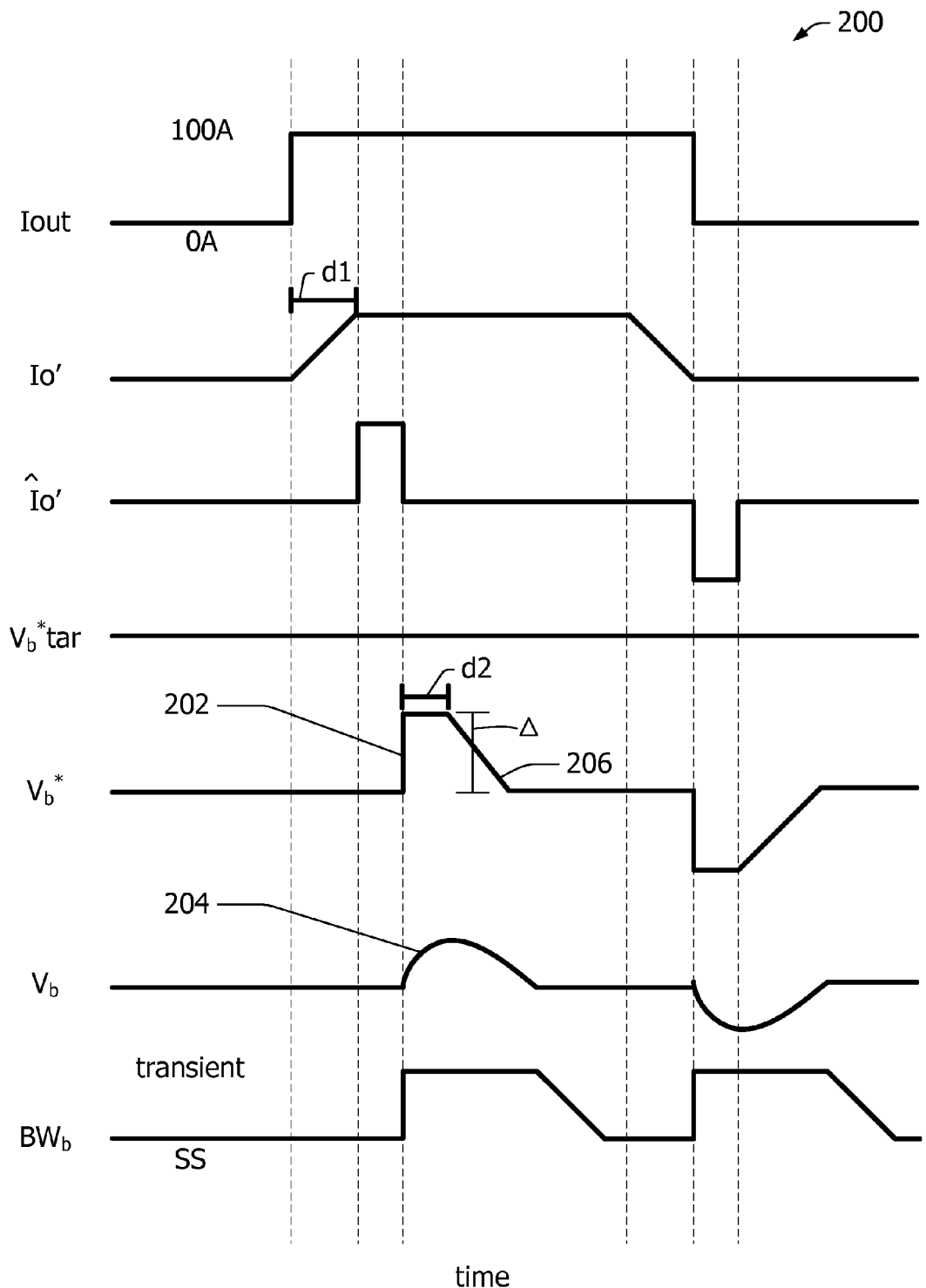
FIG. 2 is a graph showing current and voltage characteristics of selected components of the power converter shown in FIG. 1 during a load transient.

FIG. 2 is a graph 200 showing current and voltage characteristics of selected components of power converter 100 (shown in FIG. 1) during a load transient. In the exemplary embodiment, secondary stage controller 118 communicates an actual value of measured load current signal $I_o$ to primary stage controller 114 using a PWM signal. Primary stage controller 114 receives a measured load current signal $I_o'$. Because it is communicated across isolation barrier 106, the measured load current signal $I_o'$ steadily increases with a slight time delay d1.

In an alternative embodiment, rather than the measured load current signal $I_o'$, secondary stage controller 118 may communicate a differentiation signal $\hat{I}_o'$. The differentiation signal $\hat{I}_o'$ goes either positive or negative when there is a change in the load current $I_o$, rather than communicating an actual value of the load current $I_o$. More specifically, secondary stage controller 118 pulses a value of 1 to primary stage controller 114 when a large change in the load current occurs. Secondary stage controller 118 may be programmed with various thresholds defining when to indicate a load transient. For example, if a measured current change is below a predefined threshold, secondary stage controller 118 does not communicate the differentiation signal $\hat{I}_o'$. Additionally, or alternatively, secondary stage controller 118 may transmit a double pulse of the value 1, rather than pulsing a value of −1. Further, secondary stage controller 118 may pulse only the initial value of 1 indicating the start of a transient and may not pulse any representation of the value of −1.

Figure 3:
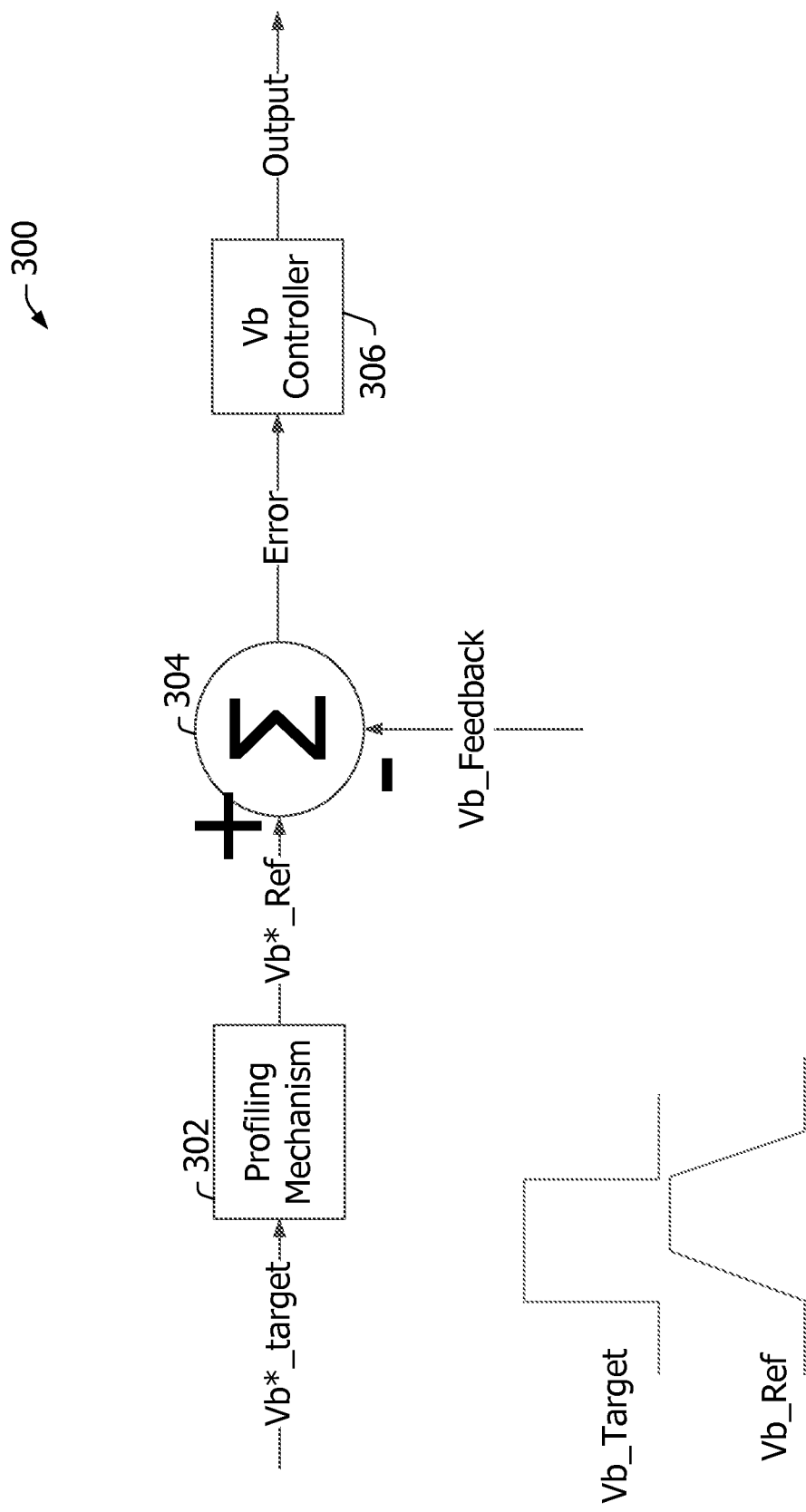
FIG. 3 is a block diagram of an exemplary control loop implemented by the primary stage controller shown in FIG. 1.

FIG. 3 is a block diagram of an exemplary control loop 300 implemented by primary stage controller 114 (shown in FIG. 1). Primary stage controller 114 includes control loop 300 for regulating the boost voltage $V_b$, the voltage across capacitor C. Primary stage controller 114 includes a target voltage $V_{b_{target}}*$ as an input. The target voltage $V_{b_{target}}*$ may be provided by primary stage controller 114, an external signal communicated to primary stage controller 114, using a peak of the AC input voltage, or from secondary stage controller 118. Primary stage controller 114 also includes a reference voltage $V_b'$ at an output of primary stage controller 114. The reference voltage $V_b'$ of the control loop follows the target voltage $V_{b_{target}}*$ using a profiling mechanism 302. For example, if the target voltage $V_{b_{target}}*$ changes as a step, then the reference voltage $V_b$ will follow the target voltage $V_{b_{target}}*$ as a ramp or a polynomial. Primary stage controller 114 then calculates an error by subtracting a feedback voltage $V_{b\,feedback}$ from reference voltage $V_b*$ at a summing junction 304. Using the calculated error, a boost voltage controller 306 manipulates the reference voltage $V_b*$ to output a boost voltage $V_b$ to respond to an increase in load current $I_o$. In normal steady state operation, the target voltage $V_{b_{target}}*$ will go up or down and the reference voltage $V_b*$ will follow it by ramping up or ramping down.

In the exemplary embodiment, assuming the target voltage $V_{b_{target}}*$ remains constant, when a sudden increase in load current $I_o$ is detected, primary stage controller 114 introduces a step change in the reference voltage $V_b*$. More specifically, upon receiving signal $\hat{I}_o'$ indicating a load transient, primary stage controller 114 introduces an artificial spike 202 in the reference voltage $V_b*$. Alternatively, artificial spike 202 may be introduced through isolation barrier 106 as a separate signal or through communication lines. Artificial spike 202 causes additional charge to accumulate in capacitor C such that when load 120 demands a spike in current, power converter 100 is able to deliver it. Control loop 300 quickly responds to artificial spike 202 as is shown by a ramping 204 of boost voltage $V_b$.

In one embodiment, for control loop 300 to more quickly respond to artificial spike 202, a bandwidth $BW_b$ of primary stage controller 114 is increased. During steady state operation, the bandwidth $BW_b$ tends to be lower relative to during a transient, which reduces ripple in load current $I_o$ and output voltage $V_o$ in spite of the alternating input voltage $V_{in}$ and current $I_{in}$. To maintain the output as stable as possible to minimize ripple, it is normal for the control loop to have a relatively lower steady state bandwidth $BW_b$. This bandwidth $BW_b$ is increased during transients to increase the voltage in capacitor C as quickly as possible without having to worry about ripple. As a result, the bandwidth $BW_b$ increases, primary stage controller 114 responds very quickly, and capacitor C delivers the current to load 120.

In the exemplary embodiment, artificial spike 202 has a value of delta Δ. Δ may be determined using a variety of methods. For example, Δ may be based on an increase in voltage with respect to the fixed target voltage or reference voltage over a period of time. Δ may be based on a percentage of the reference voltage, or it could be defined by maximum and minimum values where the increase in load 120 demand is unknown. Δ may also be a function of an increase in output current $I_o$ or output power. Δ may jump to a predetermined value, which may be a function of the AC input voltage $V_{in}$. Δ could be based on the peak of input voltage $V_{in}$, or it could be related to the maximum voltage rating of the capacitor C. Δ is chosen based on the specific application for each particular power converter.

A predetermined delay d2 may be provided between artificial spike 202 and the ramp down 206 of the boost voltage $V_b$. Predetermined delay d2 may be a fixed delay, or it may be based on one or more of output power, output current, output voltage, input voltage, and the target voltage $V_{b_{target}}*$.

During operation, in the exemplary embodiment, upon a load step, primary stage controller 114 increases the boost reference voltage $V_b*$ by introducing artificial spike 202 having a Δ value near a safe maximum value, which is peak AC input voltage $V_{in}$. Artificial spike 202 causes step-up converter 112 to increase its output and quickly flood capacitor C. In some embodiments, primary stage controller 114 also increases its bandwidth $BW_b$ during a transient to flood capacitor C faster. Because the target voltage $V_{b_{target}}*$ is not changed, the reference voltage $V_b*$ will ramp back to the target value, making the reference change temporary. Primary stage controller 114 bandwidth $BW_b$ also ramps back to its steady state value to deliver minimal output ripple.

Upon a load drop, primary stage controller 114 decreases the boost reference voltage $V_b*$ by introducing artificial spike 202 having a Δ value near a safe minimum value, which is the negative peak AC input voltage $V_{in}$. Primary stage controller 114 also increases its bandwidth $BW_b$. Because the target voltage $V_{b_{target}}*$ is not changed, the reference voltage $V_b*$ will ramp back to the target value, making the reference change temporary. Primary stage controller 114 bandwidth $BW_b$ also ramps back to its steady state value to deliver minimal output ripple.

An exemplary technical effect of the methods and systems described herein includes at least one of: (a) electrically isolating a primary stage and a secondary stage of a power conversion system using an isolation barrier; and (b) adjusting, by a primary stage controller positioned in the primary stage, a step-up converter reference voltage based on a load current signal indicative of a load transient, the load current signal transmitted from the secondary stage.

The embodiments described herein facilitate improving load transient response in power converters. A primary stage controller monitors load current measurements provided over an isolation barrier by a secondary stage controller. When a change in the load current exceeds a predetermined threshold value, the primary stage controller adjusts a boost output voltage reference to flood a DC link capacitor and increase the available voltage to meet the load demand.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power converter comprising:
    an isolation barrier having a primary stage side and a secondary stage side;
    a step-up converter positioned on said primary stage side, said step-up converter configured to condition an input voltage and generate a direct current (DC) boost voltage;
    a DC capacitor coupled to an output of said step-up converter; and
    a primary stage controller positioned on said primary stage side and coupled to said step-up converter, said primary stage controller configured to adjust a step-up converter reference voltage based on a load current signal indicative of a load transient, the load current signal transmitted from a secondary stage side of said isolation barrier, said primary stage controller configured to momentarily adjust an input current reference such that a charge rate of said DC capacitor increases to enable said power converter to provide sufficient power during the load transient.

2. The converter of claim 1, wherein said step-up converter comprises one of a boost circuit and a power factor correction (PFC) circuit.

3. The converter of claim 1, further comprising a secondary stage controller coupled to a step-down converter on said secondary stage side, said step-down converter coupled to an output of said step-up converter, said secondary stage controller configured to measure a load current provided to a load by said step-down converter and transmit the load current signal to said primary stage controller.

4. The converter of claim 3, further comprising an optocoupler configured to enable communication between said primary and secondary stage sides across said isolation barrier.

5. The converter of claim 1, wherein said DC capacitor is coupled across a DC link between said primary and secondary stage sides.

6. The converter of claim 1, wherein said primary stage controller increases in bandwidth during the load transient to increase a response time of said primary stage controller.

7. A method comprising:
    electrically isolating a primary stage and a secondary stage of a power conversion system using an isolation barrier;
    adjusting, by a primary stage controller positioned in the primary stage, a step-up converter reference voltage based on a load current signal indicative of a load transient, the load current signal transmitted from the secondary stage; and momentarily adjusting an input current reference such that a charge rate of said DC capacitor increases to enable said power converter to provide sufficient power during the load transient.

8. The method of claim 7, further comprising:

measuring, by a secondary stage controller positioned in the secondary stage, a load current provided to a load by a step-down converter; and transmitting the load current signal to the primary stage controller.

9. The method of claim 8, wherein transmitting the load current signal to the primary stage controller further comprises transmitting the load current signal to the primary stage controller across the isolation barrier via an optocoupler.

10. The method of claim 8, wherein transmitting the load current signal to the primary stage controller further comprises one of continuously transmitting the load current signal and transmitting the load current signal when a change the measured load current exceeds a predetermined threshold.

11. A power conversion system comprising:

a primary stage and a secondary stage;

a DC capacitor coupled across a DC link between the primary stage and the secondary stage;

an isolation barrier electrically isolating the primary stage and the secondary stage; and a primary stage controller positioned in the primary stage, said primary stage controller configured to adjust a step-up converter reference voltage based on a load current signal indicative of a load transient, the load current signal transmitted from the secondary stage, wherein to adjust the step-up converter reference voltage, said primary stage controller is further configured to momentarily adjust an input current reference such that a charge rate of said DC capacitor increases to enable said power converter to provide sufficient power during the load transient.

12. The system of claim 11, further comprising a step-up converter communicatively coupled to said primary stage controller in the primary stage, said step-up converter configured to condition an input voltage and generate a direct current (DC) boost voltage.

13. The system of claim 12, wherein said step-up converter comprises one of a boost circuit and a power factor correction (PFC) circuit.

14. The system of claim 12, further comprising:

a step-down converter positioned in the secondary stage, said step-down converter configured to condition the DC boost voltage to generate a DC output voltage for use by a load; and a secondary stage controller communicatively coupled to said step-down converter, said secondary stage controller configured to measure a load current provided to the load by said step-down converter and transmit the load current signal to said primary stage controller.

15. The system of claim 14, wherein said step-down converter comprises one of a buck converter and an inductor-inductor-capacitor (LLC) converter.

16. The system of claim 12, further comprising an optocoupler configured to enable communication between said primary and secondary stages across said isolation barrier.

17. The system of claim 11, wherein said primary stage controller increases in bandwidth during the load transient to increase a response time of said primary stage controller.

\* \* \* \* \*